US007040428B2

United States Patent
Arola et al.

(10) Patent No.: US 7,040,428 B2
(45) Date of Patent: May 9, 2006

(54) CHASSIS STRUCTURE FOR A FOREST MACHINE

(75) Inventors: Sami Arola, Mänttä (FI); Arto Huhmarkangas, Tampere (FI); Jouko Hyytiäinen, Juupajoki (FI); Markku Jaatinen, Julkujärvi (FI); Arto Vento, Kangasala (FI)

(73) Assignee: Timberjack Oy, Tampere (FI)

( * ) Notice: Subject to any disclaimer, the term of this patent is extended or adjusted under 35 U.S.C. 154(b) by 209 days.

(21) Appl. No.: 10/415,542

(22) PCT Filed: Oct. 30, 2001

(86) PCT No.: PCT/FI01/00945

§ 371 (c)(1),
(2), (4) Date: Apr. 30, 2003

(87) PCT Pub. No.: WO02/36412

PCT Pub. Date: May 10, 2002

(65) Prior Publication Data

US 2004/0025424 A1 Feb. 12, 2004

(30) Foreign Application Priority Data

Oct. 30, 2000 (FI) .................................. 20002384

(51) Int. Cl.
*B62D 61/10* (2006.01)

(52) U.S. Cl. .................. 180/24; 180/24.01; 180/24.07; 180/24.08; 180/419

(58) Field of Classification Search .................. 180/24, 180/24.01, 24.02, 24.07, 24.08, 410, 411, 180/415, 419, 253; 280/400, 492

See application file for complete search history.

(56) References Cited

U.S. PATENT DOCUMENTS

| | | | | |
|---|---|---|---|---|
| 3,183,991 | A | 5/1965 | Gamaunt | 180/24 |
| 3,414,072 | A | 12/1968 | Hodges et al. | 180/51 |
| 4,237,994 | A | 12/1980 | McColl | 180/179 |
| 5,366,337 | A | 11/1994 | Eriksson | 414/550 |
| 6,129,170 | A * | 10/2000 | Hickman et al. | 180/418 |
| 6,299,181 | B1 * | 10/2001 | Ericksson | 280/6.156 |

FOREIGN PATENT DOCUMENTS

EP 0 706 904 4/1996

(Continued)

OTHER PUBLICATIONS

International Search Report from Application PCT/FI01/00945 under date of Jan. 25, 2002.

(Continued)

*Primary Examiner*—David R. Dunn
(74) *Attorney, Agent, or Firm*—Quarles & Brady LLP

(57) ABSTRACT

The invention relates to a chassis structure for a working machine moving on a terrain, the chassis structure comprising a pair of front wheels and a pair of rear wheels supporting the frame, and a controlled frame joint between the frame parts, when the frame is composed of two frame parts. The chassis structure further comprises a suspension controlled by actuators and arranged to move each wheel in a level transverse in relation to the frame. Each wheel is mounted rotatably and to turn by the actuators to the suspension, and each wheel is usually provided with a hub motor for drive transmission. The chassis structure can further comprise a pair of middle wheels for a second frame part. In a method related to the chassis structure the forest machine can also be turned in place.

14 Claims, 6 Drawing Sheets

FOREIGN PATENT DOCUMENTS

| | | |
|---|---|---|
| EP | 0 968 905 | 1/2000 |
| FR | 2651741 | 3/1991 |
| FR | 2652313 | 3/1991 |
| WO | 89/00928 | 2/1989 |
| WO | 01/66369 | 9/2001 |

OTHER PUBLICATIONS

International Preliminary Examination Report from Application PCT/FI01/00945, under date of Jan. 23, 2003.

* cited by examiner

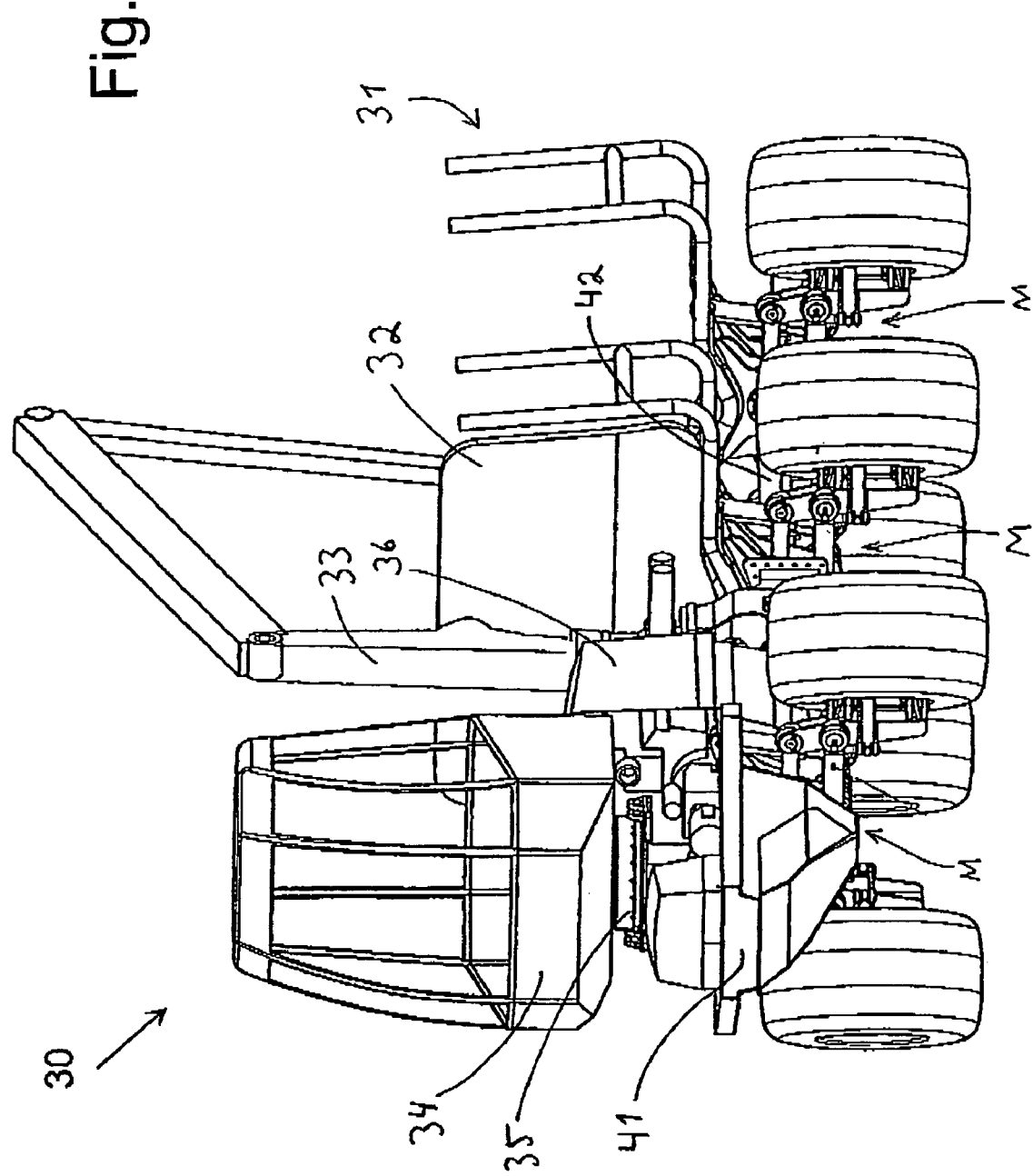

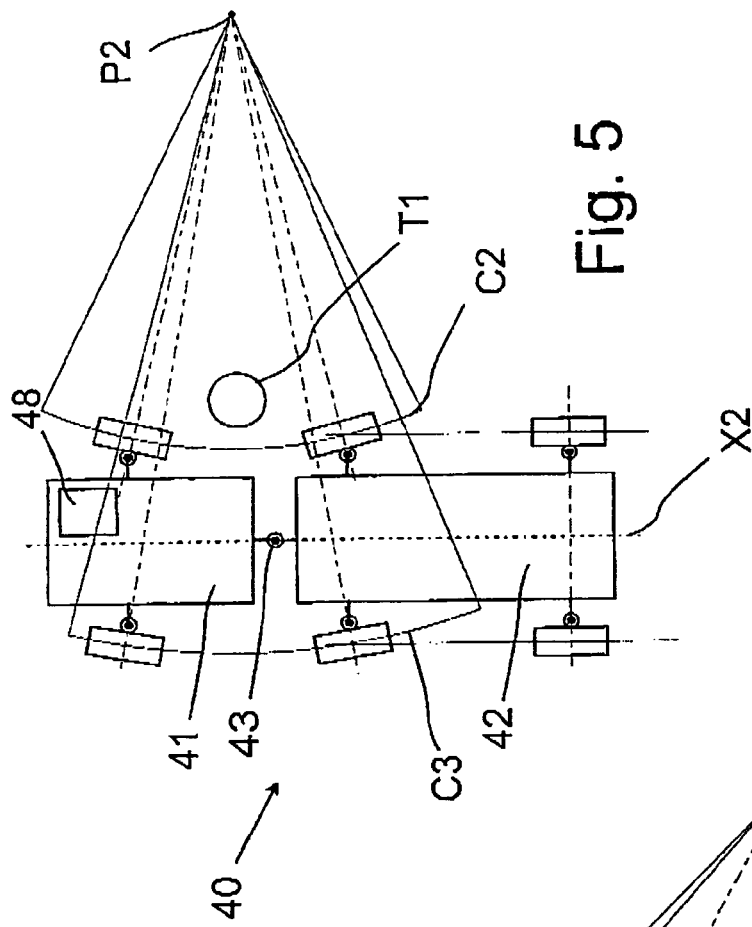
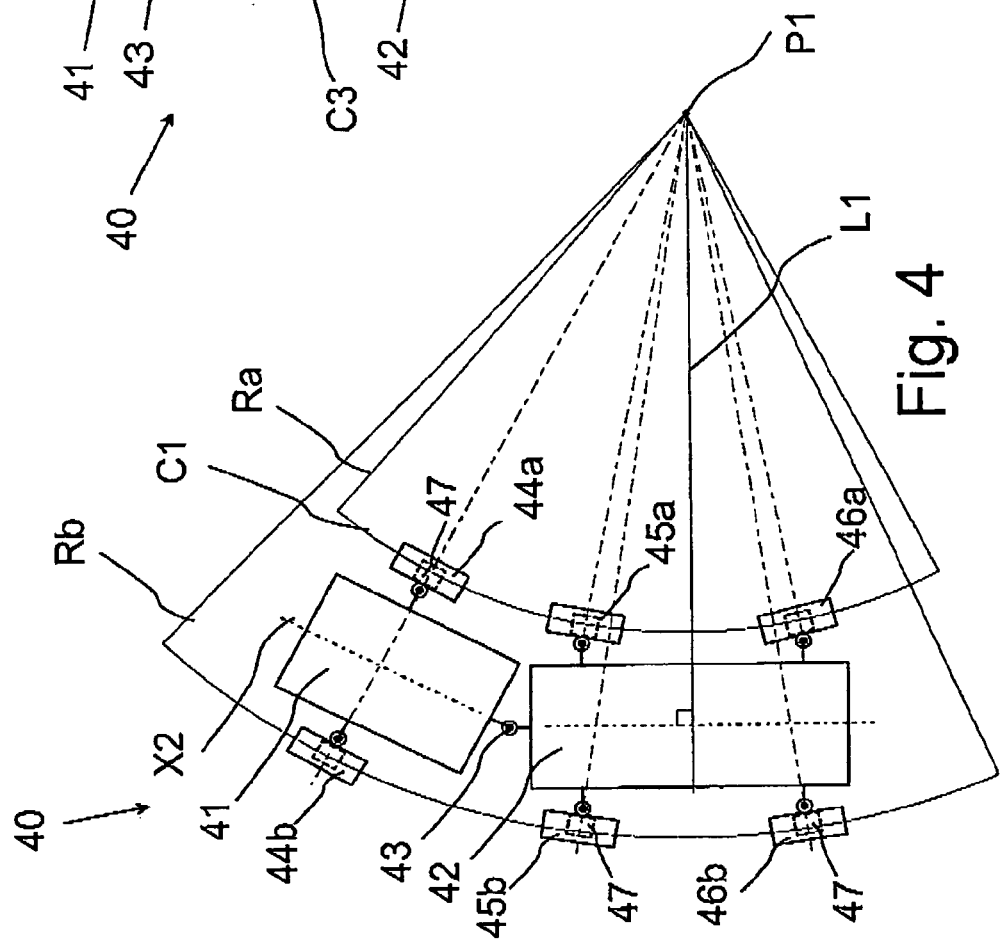

CHASSIS STRUCTURE FOR A FOREST MACHINE

FIELD OF THE INVENTION

The invention relates to a chassis structure for a forest machine moving on a terrain.

BACKGROUND OF THE INVENTION

For harvesting, forest machines are known which move on a terrain by means of wheels. These include a harvester in which a harvesting device is provided at the end of a boom assembly, a so-called harvester head for cutting and felling a tree stem and sawing it to pieces of desired length. The sawed tree stems are collected by a loading apparatus, i.e. a forwarder equipped with a grapple, and transported in the load space.

Publication WO 89/00928 discloses a working machine that comprises two frame parts connected to each other by means of a joint. The joint is used for controlling the direction of motion of the work machine. The working machine travels along a curved line by folding frame parts, wherein the centre of turn and the pivoting axle are always at an intersection in which the directions that are perpendicular relative to the frame parts intersect, projected to the same horizontal plane. Said direction is at the same time the direction of the mutual rotation axis of each pair of wheels. The wheels are supported by suspension arms of a parallelogram mechanism, said arms keeping also a wheel vertical.

Forest machines may comprise a swivel base mounted on the frame to swivel around a vertical axis and equipped with a cabin and, by its side, a boom assembly provided with a harvester head at its end. In a manner known as such, the boom assembly can also be mounted in front of the cabin or on a separate swivel base apart from the cabin.

The application publication WO 92/10390 discloses a harvester comprising two frame parts and controlled by folding the frame parts. The wheels are supported by a pendulum arm, wherein the rotation axes of each pair of wheels do share the same direction, but are not always coincident, as the height of the terrain differs at different sides of the working machine. Thus, the rotation axes intersect even in four different locations when the frame is folded. Consequently, the actual swivel centre is vague and causes, in view of some of the wheels, also diagonal sliding in curves, which damages the terrain. Even under these circumstances the centre is always perpendicular in relation to each frame part. In prior art forwarders, the second frame part is provided with a load space, wherein the tree trunks are collected from the terrain by means of a rotatably attached boom assembly at the front part of this frame part and its grapple. The second frame part is equipped with a cabin and a prime mover for the working machine.

Application publication WO 99/710221 discloses a forwarder comprising three frame parts that are folded when driving in a curve, so that the rotation axes of all pairs of wheel would share a mutual intersection point. Forces directed to the frame joints are significant, particularly at the beginning of the curve, wherein the turning radius must be gradually diminished when moving, if an aim is to prevent the pair of front wheels from advancing diagonally. The wheels are also here suspended by means of swaying arms, which causes vagueness in the swivel centre as well as gliding. To increase the capacity of weight the load space is supported by two pairs of wheels, but in this case the load space must be supported on the frame parts by joints, because straight tree stems do not bend along with the frame parts. The structure is complex and when loaded it can even prevent the frame part from folding or at least increase the folding power needed in the frame joint.

The application publication DE 19822809 A1 discloses a load-carrying vehicle comprising two two-wheel axle-group structures in both frame parts to increase the capacity of weight. The wheels of the axle group sway around a common horizontal rotation axis, which is always perpendicular in relation to the frame part. In particular when driving in a curve with the frame folded, the rotation axes of wheels intersect at least at four different locations, wherein the wheels of some of the axle groups are always gliding diagonally, particularly when driving in a steep curve, which will damage the terrain. The axle group causes damage to a wider area because, when gliding, the successive wheels of the axle group have different turning radius due to the distance between the wheels.

One known forest machine is a so-called combined machine, which combines the functions of a harvester and a forwarder. In this case, e.g. the rear frame is provided with a load space and the boom assembly is mounted rotatably on the front frame. The boom assembly and the cabin can be placed on the same rotating swivel base.

The boom assembly is provided with a harvester head, which is applicable also for loading tree trunks, wherein it is provided e.g. with grapples. The advantage is that harvesting and collection of tree stems can be performed simultaneously, wherein the need for a plurality of different machines is reduced, which reduces damage caused to growing stock.

For example in forest thinning, several growing trees are left by the side of the logging road used by the working machine, which limits the space available for the working machine. To improve the movability and to bypass trees, the turning radius should often have to be as small as possible, which is, however, limited by the stability requirements of the machine. Thus, the working machine cannot be folded infinitely, because when curving, the inner wheels come closer to each other and the outer wheels diverge from each other, wherein the centre of gravity can be positioned adversely. This will increase the risk of falling, particularly if the working machine is additionally tilted or moving with a load.

To sum up, known forest machines share a limited ability to move on a very varying forest terrain and they cause damage to the terrain. Due to structures and balance, the turning radius are limited and space demanding, wherein unnecessary damage is caused also to growing stock. Nevertheless, the wheel must be able to move sufficiently in the vertical direction because of unstable forestry terrain and obstacles to be bypassed.

A particular problem is how to pass soft and squashy areas of the terrain. Particularly in 6-wheel or larger working machines and in heavy forwarders the successive wheels add to sinking of these spots and at the same time the swaying of the frame is increased. Simultaneously, the forces folding the frame joints also increase and the load distribution between the wheels can vary, even suddenly.

SUMMARY OF THE INVENTION

It is an aim of the present invention to eliminate the above-mentioned problems by using a new chassis structure in a forest machine. The chassis structure is suitable for use e.g. in four and six-wheel harvesters, forwarders and combined machines.

The invention is suitable particularly for improving movability of a three-axle forest machine, e.g. a six-wheel forest machine provided with a frame joint. The invention is particularly suitable also for facilitating handling of a four-wheel forest machine.

The invention is used for eliminating restrictions related to evasive movements and turning movements of prior art forest machines.

Using the invention, wheels can be readily added to improve bearing capacity, yet without the need to add frame joints or driving power. Thus, two or more pairs of wheels can be placed at the front and rear frame.

Using the invention, considerable advantages are achieved. By controlling the direction of each wheel individually, it is possible to drive also to a direction that differs from the longitudinal direction of the frame, wherein it is possible to move diagonally towards side. In this case the machine is driven along different wheel paths, or an obstacle can be bypassed to the side. This will bring about considerable advantage particularly when passing soft areas, wherein successive wheels pass them distinctively at different locations, whereby sinking is decreased and the above-described problems are avoided. Particularly at curves it is important to keep the same-side wheels on the same path, so that the horizontal space required by the six-wheel working machine would be as small as possible and that damage to the terrain would be limited to a narrow area. Successive wheels can now be guided to follow separate paths also in curve drive, wherein the turning radius of each wheel is set to be different. When driving in a curve, a same common turning centre can now be attained precisely.

Particular advantage is achieved in a six-wheel load-carrying vehicle, wherein the load space can be build in a fixed position on the rear frame, because it is not necessary for the rear frame to fold in curve drive. In view of the balance, it is also advantageous that the points of support, in which the wheel touches the ground, can be kept almost stationary in relation to each other and the frame, even when driving in a curve. Thus, the point of support can be kept as central as possible and far from the wheels placed at the corners of the frame part. At the same time, it is possible to abandon axle structures that have a limited ability to maintain the frame of the forest machine in the horizontal direction. There is more freedom to place the wheels, wherein they can be placed even at regular intervals in order to balance the loads.

Particular benefit is achieved in foldable forest machines, which comprise a frame joint controlled e.g. by means of a folding cylinder. By means of a folding joint all the successive wheels of six-wheel machines can now be guided to the substantially same path. Thus, e.g. the swivel centres of two pairs of wheel of the rear frame are arranged to the same point. The wheels of the front frame are directed to the same point, as long as all the successive wheels on the same side of the forest machine are arranged at one concentric curve of a circle, e.g. by folding the front frame to the side of the turning centre. In other cases, at least one wheel of the same side moves along a different wheel path.

The frame joint of the invention is not used to change the direction at all, or only at a small scale, wherein its actuators can be measured to considerably lower pressures and stresses. The size of the frame joint can be formed lighter and smaller and it can be more readily designed in view of durability and other properties, such as folding and/or swivelling in order to implement locking. Consequently, folding can be carried out by driving the rear or front frame to the side by turning the wheels. As a result of the separate control, it is possible to change the direction of motion of the forest machine even when stationary, wherein the wheels are turned to a new direction.

Particular advantage is obtained when each wheel of a four-wheel harvester, which may even lack the frame joint, is provided with a hub motor, whereby the rotation directions of the wheels can be changed to opposite. Thus, the machine can be rotated even in place, when the fulcrum can be placed in an area limited by the wheels of the machine, e.g. at the centre of weight. Thus, the turning point of each wheel must be sufficient, which can be more readily implemented in a short harvester. This is beneficial particularly when rounding sharp corners, wherein the working machine is first driven directly to the corner, turned in place, e.g. 90° and driven straight out of the corner. Thus, the necessary space is defined only by the dimensions of the forest machine itself, not by the turning radius achieved.

As a result of separate suspension, it is also possible to keep the load balanced between different wheels, to keep the load distribution as desired, and to keep the frame at a desired position in various situations. Thus, it is possible to measure e.g. the load pressure of the wheel-suspension actuator by pressure gauge means, the position of the suspension by position gauge means arranged at its joints, and thus also the position of the frame. Based on these, the mutual position of the suspensions are controlled on the basis of these in order to increase or decrease the load of some of the actuators, if necessary even without changing the position of the frame. In some cases it is also advantageous to arrange the wheelbase of the rear frame to be adjustable in a six-wheel forest machine. By shortening the wheelbase, steady load can be maintained when surmounting steeper obstacles, even if the maximum vertical movement of the wheel suspension was the same as in the standard wheelbase. Another advantage is that the turning radius can be diminished using the same maximum angles of inclination or, alternatively, the maximum angle of the suspension can be diminished without decreasing the turning radius.

The chassis structure of the invention can provide a very versatile control of the wheels under coordination of the control system of the forest machine and in accordance with the selections of the driver. The control system, in turn, controls the control means known as such of the actuators, which in turn control the position and movement of the actuators e.g. by controlling their pressure levels and volume flows. A working machine is generally provided with a pressure medium arrangement known as such, in which hydraulic fluid pressured by a pump is used in energy transmission and led to the actuators and also to the power transmission system of the wheels. Thus, it is possible to command the control system to arrange wheels e.g. to a state in which the forest machine rotates in place, wherein the control system determines the angles of inclination of the wheels and selects the directions of rotation in accordance with the desired turning direction. In the second state, normal straight drive and curve drive are followed either using the same path or different paths, wherein the control system also takes care of folding and/or controlling the wheels along the desired path. The driver takes care e.g. only of the travel direction of the front wheels and the steepness of the curve, wherein the control system, in turn, takes care of controlling the middle and rearward wheels.

BRIEF DESCRIPTION OF THE DRAWINGS

In the following, the invention will be described in more detail by using as examples advantageous embodiments of the invention with reference to the appended drawings, in which FIG. 3 shows a perspective view of a load-carrying vehicle applying the module of FIG. 2, when a forwarder is diagonally moving to the side, and FIG. 4 shows a top view of a chassis structure according to a preferred embodiment of the invention behaving in curve drive, FIG. 5 shows a top view of a chassis structure according to a preferred embodiment of the invention behaving when driving the same path.

DETAILED DESCRIPTION OF THE INVENTION

Figure 1:
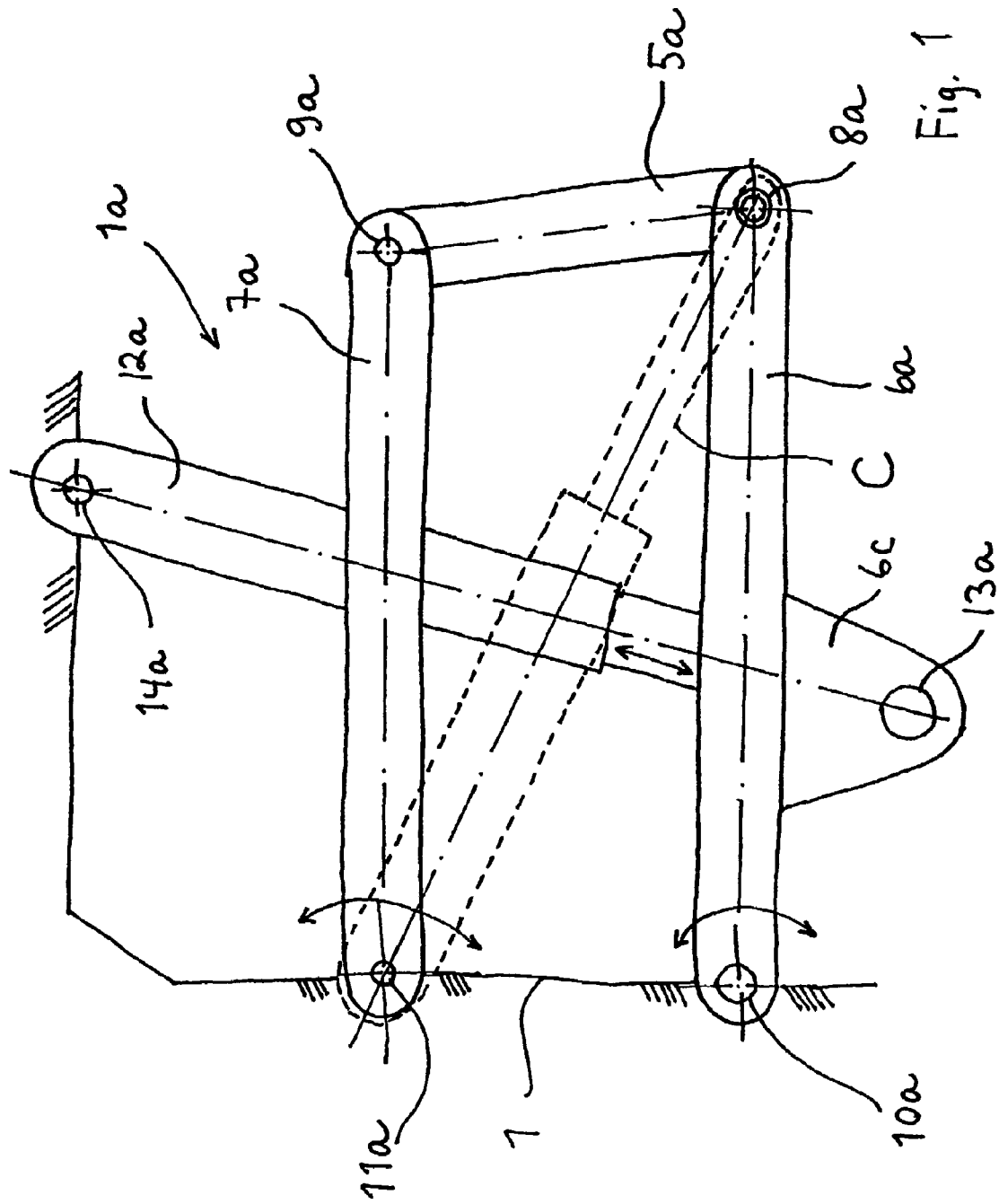
FIG. 1 shows the structure of a joint parallelogram of the suspension in a reduced view and the mounting of a cylinder seen from the direction of the rotation axis.
Figure 2:
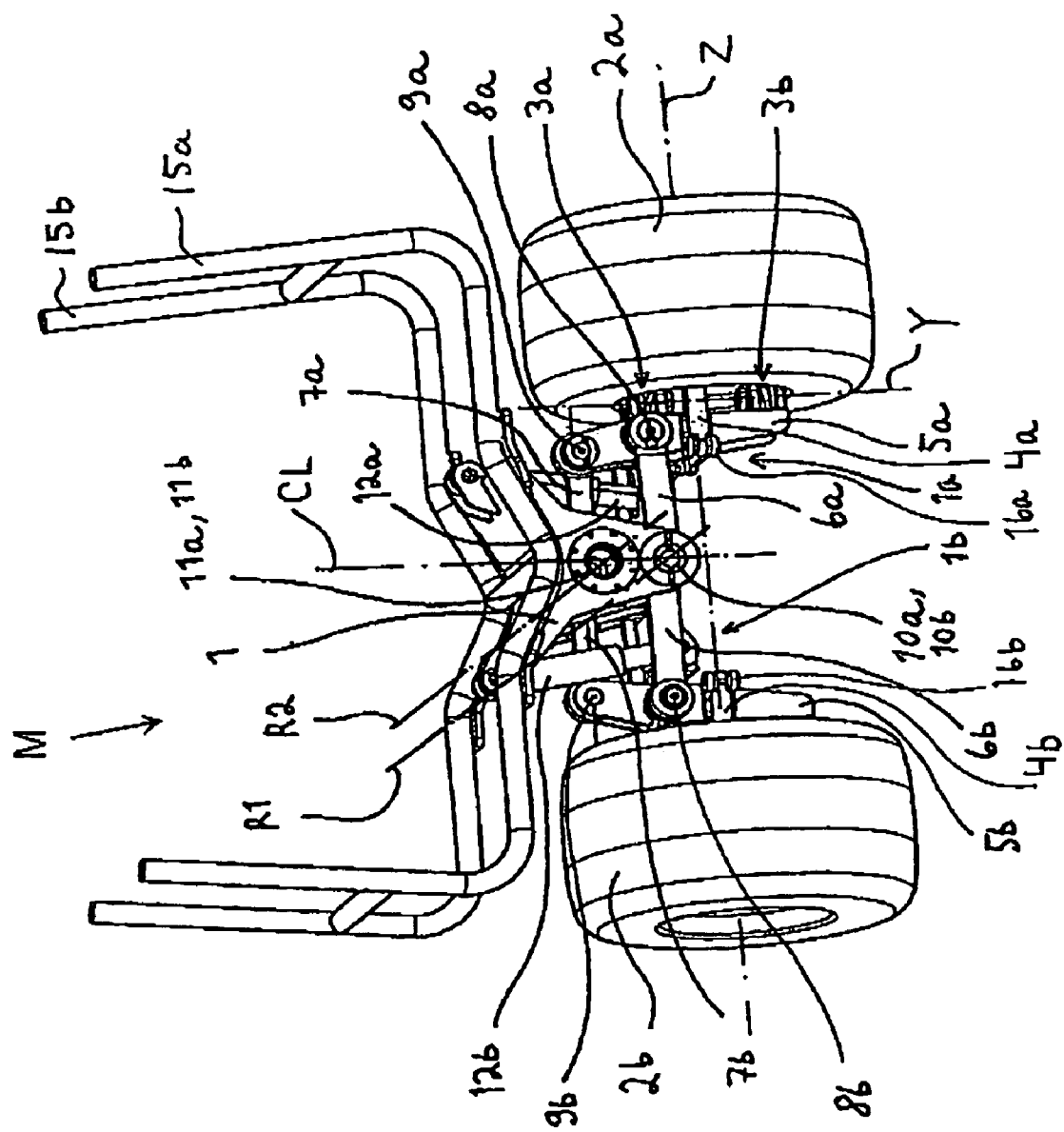
FIG. 2 shows a module according to an advantageous embodiment of a chassis structure of the invention in a perspective view in the middle position of the wheels.

FIGS. 1 and 2 illustrate an arrangement of a chassis structure according to the invention for suspension of wheels. FIG. 1 shows a simplified joint parallelogram and various arms thereof in the middle position. FIG. 1 shows also the positions of suspension arms 6a and 7a as well as a cylinder actuator 12a controlling the position of a mounting arm 5a in the vertical direction. A wheel is mounted to the mounting arm 5a as shown in FIG. 2. For the sake of comparison, prior art placement of a cylinder is illustrated with a broken line C. If the suspension arms 6a, 7a of the joint parallelogram are parallel and equal in length, the vertical position of the mounting arm 5a and thereby the vertical position of the wheel 2a are changed as little as possible in the different positions of the joint parallelogram. Normally, the arms 6a, 7a are unequal at least in length.

The suspension of wheels according to prior art is problematic when there is a need to limit the dimensions of the working machine, particularly its width and height, without affecting the capability of the forest machine to proceed on the terrain. The cylinder C is normally mounted at a point where the piston stroke becomes very long for moving the wheel from the upper position to the lower position. For this reason, the arms also become long, to fit the cylinder C in between, both short and long, which affects particularly the width of the working machine, and it is particularly difficult to make the long suspension arms steadfast. In addition, when there is a need to reduce the width of the working machine, the moment arm of the cylinder C must be reduced, wherein the play between the upper position and the lower position is reduced.

By placing the cylinder 12a, in accordance with FIG. 1, vertically and mounting its one end 13a preferably to the lower suspension arm 6a and its other 14a to the frame part 1, it is possible to reduce the cylinder 12a stroke in relation to prior art. However, the moment arm of the cylinder 12a can be kept substantially equal relative the prior art, but the mounting point of the one end 13a in the lower suspension arm 6a can be shifted closer to the frame 1. Thus, there will be more space for other structures at the outermost end 8a of the suspension arm 6a. Due to shorter cylinder stroke the vertical cylinder 12a does not harmfully increase the height of the structure, particularly when it is mounted on the lower support arm 6a. Underneath the support arm 6a there is also space for lugs 6c, which can be used for lowering the joint 13a. As the mounting point of the one end 13a is placed in the suspension arm 6a and not at the outermost end 8a, a change in the length of the suspension arm 6a will not necessarily affect the structure of the cylinder 12a, the levels of pressure used, or particularly the moment arm. With the vertical position, also the moment arm formed by the suspension arms 6a, 7a in different positions will be changed less in the operating range desired when the wheel 2a moves up and down, which makes it easier to regulate the pressure level.

With reference to FIG. 2, the chassis structure comprises a frame part 1 placed on a vertical central line CL of the working machine and forming a part of a frame of a forest machine intended to move on a terrain, such as a harvester, a forwarder or a combined machine. The working machine comprises a foldable front and rear frame part, which move by means of one or more pairs of wheels. The wheels are connected to the frame part by means of a suspension as described. Placed on the frame is also a prime mover for the working machine, typically a diesel engine. The working machine is typically equipped with a hydrostatic transmission system.

Figure 6:
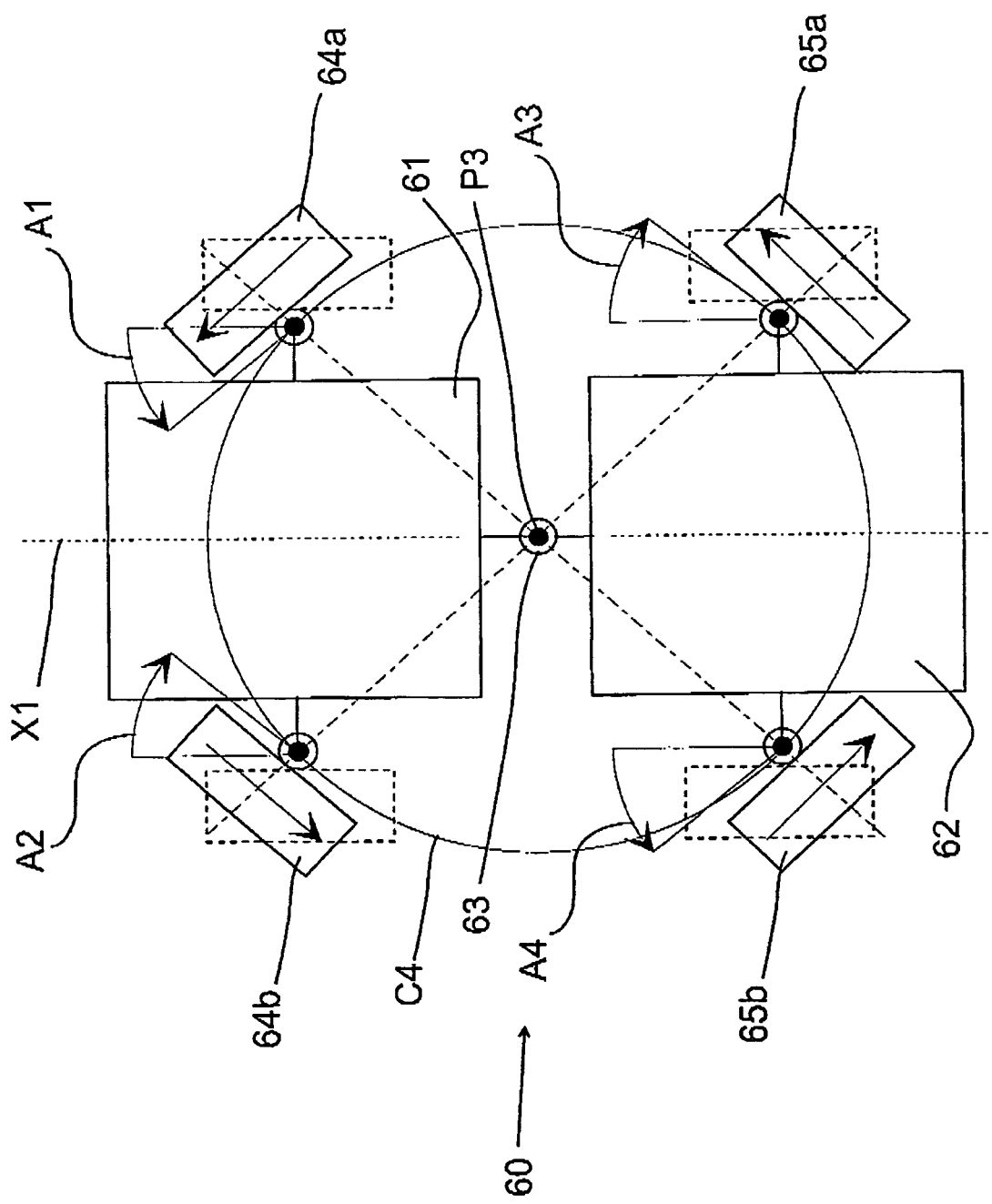
FIG. 6 shows a top view of turning a chassis structure according to an advantageous embodiment of the invention.

A boom assembly is placed on top of a front frame 61 of a chassis structure 60 of a foldable four-wheel harvester in accordance with FIG. 6. The boom assembly is arranged for example in front of a cabin, and the end of the boom assembly can be connected to a harvester head. The cabin and the boom assembly can be located on the same or different swivel bases, which swivel around vertical axes. They can also be located in different frame parts. The cabin can also be stationary or at least tiltable relative the frame or to the side. The motor is placed in the frame part further behind 62. The frame parts 61, 62 are connected to each other by the frame joint 63, which allows the turning of the frames with respect to each other around a vertical axis. If the suspension limits the turning of a wheel, a foldable middle joint can be used to reduce the turning radius, wherein manoeuvrebility is improved. In the absence of the joint 63, the frame parts 61, 62 constitute a uniform frame. If the suspension limits the lifting and lowering of the wheel, the swivelling middle joint can be used to increase the vertical movement of the wheel in order to pass obstacles. Each frame part has at least one pair of wheels 64a, 64b and 65a, 65b having suspensions corresponding to FIG. 2.

A load space is arranged on top of the rearward frame part 42 of the chassis structure 40 of the foldable six-wheel load-carrying vehicle or combination machine in accordance with FIGS. 4 and 5 for transporting timber, such as delimbed and cut tree stems. The motor is placed in the front frame part, in front of or behind the cabin. The boom assembly of the forwarder is connected in a swivelled manner to the front part of the rear frame 42. In the combination machine the boom assembly is provided on top of the front frame 41, for example in the rear part thereof. The cabin of the front frame 41 and the boom assembly can be placed on the same or different swivel bases, swivelling around vertical axes. The frame parts 41, 42 are connected to each other by the frame joint 43, which at least allows the turning of the frame parts with respect to each other around a vertical axis, and advantageously allows them also to turn with respect to each other around an axis X2 that is parallel to the longitudinal direction of the working machine. The rear frame 42 comprises at least two pairs of wheels 45a, 45b and 46a, 46b and the front frame 41 comprises at least one pair of wheels 44a, 44b, having suspensions corresponding to that in FIG. 2.

FIG. 2 comprises a chassis structure further equipped with two substantially U-shaped bunks 15a, 15b, which are mounted on the frame part 1, wherein it forms a part of the rear frame 42 illustrated in FIGS. 3 and 4. A corresponding frame part 1 with suspensions and wheels but without bunks, i.e. a module M, can constitute a part of the front frame part 41 or the frame part 61, 62 of FIG. 6. With further reference to FIG. 2, the frame part 1 is supported by wheels 2a and 2b placed on its each side. The wheels 2a and 2b are normally pneumatic rubber tyres fitted on a removable rim. Wheels of FIGS. 4, 5 and 6 correspond to these wheels. The rim is attached to the hub of the wheel in a removable manner. The hub is, in turn, attached in a rotatable and journalled manner known as such to a non-rotatable hub frame. The hub frame is attached to the suspension through journalled joints 3a, 3b, which also support the hub frame and thus also the rotating wheel. The wheel hub is rotated in a manner known as such by a pressure medium driven hub motor arranged to rotate the rim and the wheels and thus to generate a drive to move the working machine. A corresponding hub motor 47 (see FIG. 4) can be fitted on all the wheels of the forest machine. On the other hand, the hub motor is coupled by means of an axis to the wheel hub and, on the other hand, mounted to the hub frame centrally.

The wheel hub and the hub frame are placed almost entirely inside the rim and the hub motor is placed partially inside the hub frame. The wheel is rotated around a substantially horizontal axis Z. Furthermore, the wheel hub is arranged to swivel around a substantially vertical axis Y by means of two on top of each other placed joints 3a, 3b, wherein the direction of motion of the working machine can be controlled by steering the wheel 2a. The axis Y travels through joints 3a, 3b. The wheel hub is turned by means of actuators, preferably by pressure-medium driven cylinders 4a, 4b, which are placed on both sides of the axis Y. They are used to generate a moment force that rotates the wheel 2a around the axis Y. The actuators 4a, 4b are attached by means of the joint 16a, 16b on the one hand to the mounting arm 5a, 5b and on the other hand by means of the joint to the hub frame. Alternatively, for turning the wheel one double-acting cylinder or two single-acting cylinders are sufficient, but the action is non-linear or larger cylinders are needed.

With reference to FIG. 1, the suspension comprises a substantially vertical mounting arm 5a where also the joints 3a and 3b are arranged. The mounting arm 5a is mounted to the frame 1 by means of a lower suspension arm 6a and an upper suspension arm 7a, which are substantially parallel. Each suspension arm 6a, 7a is mounted to the mounting arm 5a by means of a joint 8a or 9a, the joints allowing the rotation of the suspension arm in relation to the mounting arm around a substantially horizontal axis. Each suspension arm 6a, 7a is mounted to the frame 1 by means of a joint 10a or 11a, the joints allowing the swivelling of the suspension arm around an axis that is substantially horizontal in relation to the frame. The axis is parallel to the longitudinal direction of the forest machine. The suspension arms 6a and 7a as well as the joints 8a, 9a, 10a and 11a (and the suspension arms 6b and 7b as well as the joints 8b, 9b, 10b, and 11b) constitute a parallelogram-like structure, wherein in spite of the swivelling of the suspension arms, the mounting arm 5a remains substantially vertical and the wheel 2a remains substantially in the same position, elevated to a different height. To be exact, the wheel is moving on a level that is substantially vertical and perpendicular to the longitudinal direction, because only the supporting arms are rotating around the longitudinal direction. To increase the ground clearance, the joints 3a, 3b are mounted close to the lower part of the mounting arm 5a or on an extension thereof and the supporting arms 6a, 7a are mounted close to the upper part of the mounting arm 5a.

In the arrangement of FIG. 2, the suspension arms 6a, 6b, placed on each side of the frame part 1, are arranged to swivel around the same axis R1, by means of joints 10a and 10b, respectively. Thus, the joints 10a and 10b are preferably placed on said centre line CL. The joint 10b of the suspension 1b corresponds to the joint 10a of the suspension 1a, and the suspensions correspond to each other also in other respects. The wheels 2a and 2b are preferably spaced by the same distance from the centre line CL, and the corresponding arms of the different suspensions are preferably equal in length, wherein the suspensions of the wheels operate in the same way. Correspondingly, the suspension arms 7a and 7b, placed on each side of the frame 1, are arranged to swivel around the same rotation axis R2, by means of joints 11a and 11b, respectively. The joints 11a and 11b are thus preferably placed on said centre line CL and above the joints 10a and 10b. It is obvious that the rotation axes of the supporting arms 6a, 6b can be placed parallelly and separately on side of each other, wherein the supporting arms 6a, 6b can also be placed crosswise with respect to each other. The rotation axes of the supporting arms 7a, 7b can be placed in a corresponding manner.

The more detailed structure of the joints may vary, but in the structure of FIG. 2, the joints 10a and 10b, as well as the joints 11a and 11b, are further placed one after the other in the direction of the axes R1 and R2. Thus, the suspension arms on different sides of the frame 1, for example the suspension arms 6a and 6b, are placed on different lines, wherein they can also be placed crosswise. For moving the suspension arms 6a and 6b, an actuator 12a operated by a pressurized medium, preferably a hydraulic cylinder, is coupled between the frame 1 and the lower suspension arm 6a, by means of joints 13a and 14a. There can be e.g. two support arms 6a, 6b one after another to stiffen the suspension, wherein they can also be connected by a flange structure, in which in turn the cylinder 12a and the joint 13a can be mounted. The cylinder 12a is mounted above the upper suspension arm 7a and substantially in the vertical direction. The cylinder 12a is mounted between the joints 8a and 10a, wherein the cylinder 12a is placed in the free space between the frame 1 and the mounting arm 5a. By means of the actuator 12a, the suspension 1a is maintained in a desired position to support the frame 1 at a desired height. By means of the actuators 12a and 12b of the suspensions 1a and 1b, the frame part can also be kept horizontal on an uneven terrain. The frame can be kept in balance, if the wheel 2b hits a bump on the terrain or if the wheel 2a hits a pit on the terrain. In the lowermost position of the wheels 2a, 2b, the ground clearance can be increased by adjusting the suspension.

The frame part 1 and the suspensions 1a, 1b of the chassis structure are arranged to constitute the module M, which can be reproduced and applied in the implementation. The frame part 1 is produced in a desired length, wherein it can be directly connected to another corresponding module M to form a multi-wheel frame part of the working machine. Modules M can also be connected to each other by means of a varying frame connector. Thus, between the modules M can be placed e.g. a telescopic structure, the length of which is changed by means of cylinders in the longitudinal direction of the frame part. Thus, for example the wheelbase of the rearward frame of the forest machine can be changed. Alternatively, there is a guide structure between the modules M, which is transferred by means of a pressure-medium driven motor. At the same time, the load space is mounted by joints on top of the modules M in a manner that their mutual movement is allowed.

FIG. 3 illustrates in more detail a load-carrying vehicle 30 in accordance with an advantageous embodiment of the invention, comprising a chassis structure corresponding to the one shown in FIG. 4. It comprises a two-wheel front frame 41, which is formed of one module M in accordance with FIG. 2, and a four-wheel rear frame 42, which is formed of two modules M, which are connected to each other by means of the frame joint in accordance with FIG. 7, which can preferably also be locked. The distance between the modules M of the rear frame 42, which is also the axle spacing, is in this case fixed. The forest machine 30 further comprises, fitted in the rear frame 42, a load space 31, a timber shield 32 and a boom assembly 33. The forest machine 30 further comprises a cabin 34 fitted onto the swivel base 35 in the rear frame 41, and a motor 36.

Figure 7:
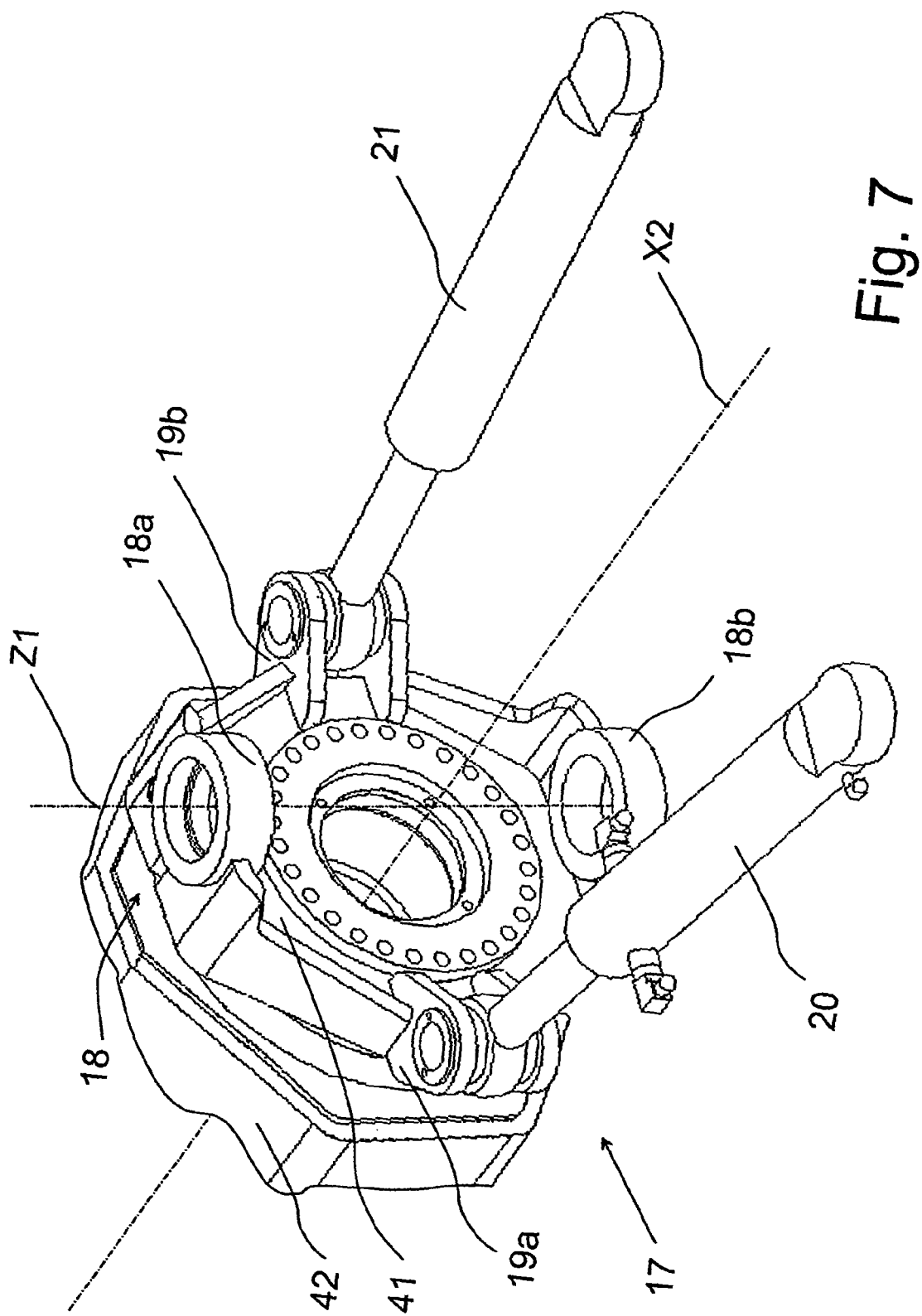
FIG. 7 shows a perspective view of a frame joint applied in a load-carrying vehicle and chassis structures according to FIG. 3.

FIG. 7 illustrates a swivel joint 17 that is applicable to be used as the frame joint of a forest machine. The swivel joint 17 constitutes the frame joint 43, 63 of the working machine 40, 60 according to FIGS. 3, 4 and 6. The swivel joint 17 is fitted between the frame parts 41 and 42, which frame parts swivel in relation to each other around an axis X2. The frame part 42 is shown in a cut view. The axis X2 is normally parallel with the longitudinal direction of the working machine. A circumferential bearing between the parts 41, 42 is usually placed inside the joint 17. It should be noted that the order of frame parts 41, 42 can be changed in order to mount the swivel joint 17. The frame part 41 of the working machine is also provided with a joint 18, by means of which the joint 17 and the rest of the frame part (not shown in the figure) are rotated with respect to each other around a vertical axis Z1. As a matter of fact, the frame part 41 of FIG. 7 constitutes a part of the swivel joint 17 or even a part of the frame part 42, because the part 41 is not folded in relation to the part 42, but is folded in relation to the rest of the frame part. The joint 18 is utilized when the working machine is folded. For this purpose, the joint 18 comprises two lugs 18a and 18b provided at a distance from each other for bearing. The lugs are preferably placed on different sides of the axis X2. The axis Z1 preferably intersects the axis X2. The joint 18 and the cylinders 20, 21 can also be eliminated totally, wherein the frame parts 41 and 42 rotate with respect to each other only. This rotation movement can also be locked and released in a controlled manner by means of a locking device of the swivel joint 17 known as such.

Lugs 19a and 19b are provided symmetrically on different sides of the axis Z1, at a distance from each other. The first end of a first rotating cylinder 20 is mounted by means of a joint to the lug 9a, and the first end of a second rotating cylinder 21 is mounted by means of a joint to the lug 19b. The second ends of the cylinders 20 and 21 are mounted by means of joints to that part of the first frame part 41 which is mounted to the joint 18, and is not folded. By controlling the linear movement of the cylinders the frame parts are turned in relation to each other around the axis Z1. The cylinders are rotated at both ends around a substantially vertical axis. The joint 18 and the lugs 19a, 19b can be attached directly to the frame part 42, wherein no rotational movement is present and the frame parts 41, 42 are only folded in relation to each other.

In FIG. 4 the chassis structure 40 is shown in a curve, wherein the wheels 44a, 45a and 46a have the same turning radius Ra, wherein the joint 43 is folded, wherein also the wheel 44a has been retained in the same curve C1. When the turning point P1 is located perpendicularly in relation to the frame part 42, halfway between the wheels 45a, 46a, at least the wheels 45b and 46b can be placed on the same turning radius Rb. Due to the dimensioning of the suspension, the wheel 44b deviates from the same path only to a small extent. When the turning point P1 is located elsewhere than on the axis L1, all the wheels cannot always be directed to the same path when the frame parts are folded. The wheels can however be turned perpendicular in relation to the turning point, wherein diagonal movement is avoided. Moreover, by folding the chassis structure it is now possible to constantly minimize the distance between the paths of different wheels and to direct them to an almost identical path.

In one example, the driver will choose mainly the direction of travel during driving by turning the wheels 44a, 44b, wherein the control system 48 (FIG. 5) takes care of directing the other wheels towards the same path. Furthermore, it attends to the mutual position of the wheels 44a, 44b, so that these could share the same turning centre in a curve. This can be achieved by the chassis structure 40 described and illustrated in FIG. 5. When driving straight ahead, the front wheels 44a, 44b have first bypassed an obstacle T1 by driving along the curves C2, C3, wherein they further share a mutual turning centre P2, which curves are followed also by the middle wheels 45a, 45b after having reached that point. The rearward wheels 46a, 46b continue further directly to the curves C1, C2, following said curves. If necessary in some situations, the frame joint 43 can be free and unloaded, wherein the folding cylinders 20, 21 of FIG. 7 are not used, because the wheels take care of choosing the direction and, at the same time, the frame parts are also folding to the right position automatically. For diagonal driving, the turning angles of all the wheels are set to be the same, as the frame parts extend directly and the frame joint 43 is locked, but with the frame parts folded, the angles of the wheels vary when being directed to the same direction. When driving a curve, the inner wheel of the pair of wheels must have a smaller rotation speed than the outer wheel to prevent it from sliding and to prevent damage to the terrain. In order to provide balanced drive, every wheel is preferably provided with a hub motor, wherein the wheel can be also actively directed to a desired direction.

FIG. 6 shows a special structure of the chassis structure 60 for a four-wheel harvester and a control space in which it can be turned in place. The turning centre P3 of the turning circle C4 is thus placed on an area limited by the wheels, for example centrally. In this case, the inner sides of the wheels 64a, 64b and 65a, 65b are turned perpendicular in view of the centre P3 and towards it, wherein also their direction of rotation is perpendicular. In accordance with FIG. 2, the axis Y is placed also inside the wheel, wherein it is located on the side of the frame, between the wheel and the frame part. Particularly noteworthy is the crosswise positioning of each pair of wheels, wherein the wheels of the pair of wheels are turned to opposite directions by the wheel proportions of A1, A2, A3 and A4. The direction of rotation of the hub motor is chosen so that the wheels of each pair of wheels are rotating to opposite directions, and the wheels on the same side of the working machine, for example 64a and 65a, are rotating to the same direction. The angles A1, A2, A3 and A4 remain small compared to a situation in which the other wheel of the pair of wheels should be turned 180° to the opposite direction, if the wheels of the pair could not have a different direction of rotation. Normally, the angles A1, A2 are of the same size and angles A3, A4 are of the same size with each other, when the point P3 is on the line X1. In the figure, the frame joint 63 is locked, which corresponds to the operation of a uniform frame. The angles A1, A2 (and A3, A4) are different from each other when the frame joint 63 is folded in an angle that will be taken into account by the control system in the calculation when setting the wheels. When the turning centre P3 is located elsewhere than in the area limited by the wheels, the outer sides of the wheels on one side and the inner sides of the wheels on the other side are always directed towards the turning centre.

The invention is not limited solely to the above-presented embodiment, but it can be modified within the scope of the appended claims. The same principles can be implemented also in an eight-wheel working machine, wherein there exist two successive middle wheel pairs supporting different frame parts. Furthermore, it is obvious that particularly in a six-wheel harvester the frame that is generally frontward in view of the motion of travel can also be said second frame part.

What is claimed is:

1. A chassis structure for a forest machine moving on a terrain, the chassis structure comprising at least:
    a pair of adjacent front wheels arranged to support a first frame part placed therebetween,
    a pair of adjacent rear wheels arranged to support a second frame part placed therebetween, and
    a pair of adjacent middle wheels arranged to support the second frame part,
    a frame joint arranged to fold the first frame part and the second frame part in relation to each other at least around an axis that is vertical and transverse in relation to a horizontal longitudinal direction to the forest machine,
    a first actuator to control the folding,
    a suspension between each wheel of the pair of front wheels and the first frame part and between each wheel of at least the pair of middle wheels and the second frame part,
    wherein each suspension comprises a second actuator arranged to change the position of the suspension in relation to the corresponding first or second frame part for elevating and descending the corresponding wheel, wherein:
    each suspension is arranged to elevate and descend the corresponding wheel with respect to the corresponding frame part in a plane that is vertical and transverse in relation to the horizontal longitudinal direction of the forest machine, and each wheel is mounted in a rotatable and turnable manner to the corresponding suspension,
    wherein each suspension further comprises a third actuator arranged to turn the corresponding wheel with respect to the suspension and with respect to the corresponding frame part around an axis that is vertical and transverse in relation to said horizontal longitudinal direction,
    wherein the third actuator is arranged to guide the wheels to a correct position at each moment of time during driving, and
    wherein, during driving a curve for bypassing an obstacle after driving straight ahead, the third actuator is arranged to control both the pair of front wheels and the pair of middle wheels to follow said curve for bypassing the obstacle, the pair of middle wheels being controlled to drive the curve by first driving straight ahead until the curve is reached and then following the curve, the pair of middle wheels being controlled to drive straight ahead even if the pair of front wheels is already following the curve.

2. The chassis structure of claim 1, wherein each wheel is fitted with a hub motor.

3. The chassis structure of claim 1, wherein each suspension comprises:
    a mounting arm,
    a lower suspension arm, and
    an upper suspension arm,
    wherein the lower suspension arm is mounted by means of a first joint to the frame part and by means of a second joint to the mounting arm, said upper suspension arm being mounted by means of a third joint to the corresponding frame part and by means of a fourth joint to the mounting arm, the corresponding wheel being mounted by means of a joint to the mounting arm, the corresponding second actuator being mounted between the lower suspension arm and the frame part, and the corresponding third actuator being mounted to the mounting arm.

4. The chassis structure of claim 1, wherein the frame joint is further arranged to allow rotation of the first frame part and the second frame part around the longitudinal horizontal direction in relation to each other.

5. The chassis structure of claim 1, wherein the first frame part and the second frame part are composed of one or a plurality of identical module structures, the corresponding suspensions being placed on both sides of said module structure.

6. The chassis structure of claim 1, wherein the frame joint comprises a joint part that is mounted to the first frame part by a vertical joint, the first actuator being mounted between said joint part and said first frame part.

7. The chassis structure of in claim 1, wherein the third actuator is arranged during driving to control the pair of rear wheels to follow a path already followed by the pair of front wheels.

8. The chassis structure of claim 1, wherein the third actuator is arranged during driving the curve to control the pair of middle wheels and the pair of rear wheels to follow a path already followed by the pair of front wheels.

9. The chassis structure of claim 1, wherein the third actuator is arranged during driving the curve to control the pair of rear wheels to a path already followed by the pair of middle wheels.

10. The chassis structure of claim 8, wherein the turning centre of the second frame part following the curve is located perpendicularly in relation to the second frame part, halfway between the pair of middle wheels and the pair of rear wheels.

11. The chassis structure of claim 1, wherein the third actuator is further arranged to control the pair of rear wheels to drive the curve by first driving straight ahead until the curve is reached and then following the curve.

12. The chassis structure of claim 2, wherein each suspension comprises:
    a mounting arm,
    a lower suspension arm, and
    an upper suspension arm,
    wherein the lower suspension arm is mounted by a first joint to the corresponding frame part and by a second joint to the mounting arm, said upper suspension arm being mounted by a third joint to the frame part and by a fourth joint to the mounting arm, the corresponding wheel being mounted by a joint to the mounting arm, the corresponding second actuator being mounted between the lower suspension arm and the corresponding frame part, and the corresponding third actuator being mounted to the mounting arm.

13. The chassis structure of claim 3, wherein the frame joint is further arranged to allow rotation of the first frame part and the second frame part around the longitudinal horizontal direction in relation to each other.

14. The chassis structure of claim 9, wherein the turning centre of the second frame part following the curve is located perpendicularly in relation to the second frame part, halfway between the pair of middle wheels and the pair of rear wheels.

* * * * *